Jan. 13, 1959

R. D. RIVERS 2,868,319

ELECTROSTATIC AIR FILTER CELL WITH
CONDUCTIVELY STRIPED FILTER WEB

Filed Dec. 19, 1955

INVENTOR.
RICHARD D. RIVERS

BY *Arthur Robert*

ATTORNEY

Jan. 13, 1959
R. D. RIVERS
2,868,319
ELECTROSTATIC AIR FILTER CELL WITH
CONDUCTIVELY STRIPED FILTER WEB
Filed Dec. 19, 1955
2 Sheets-Sheet 2
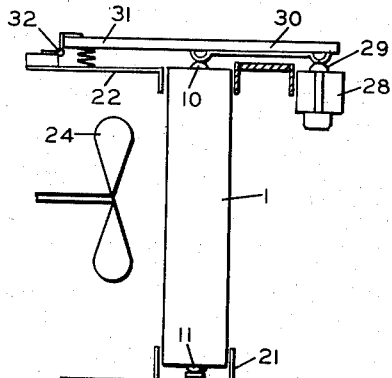
FIG. 8
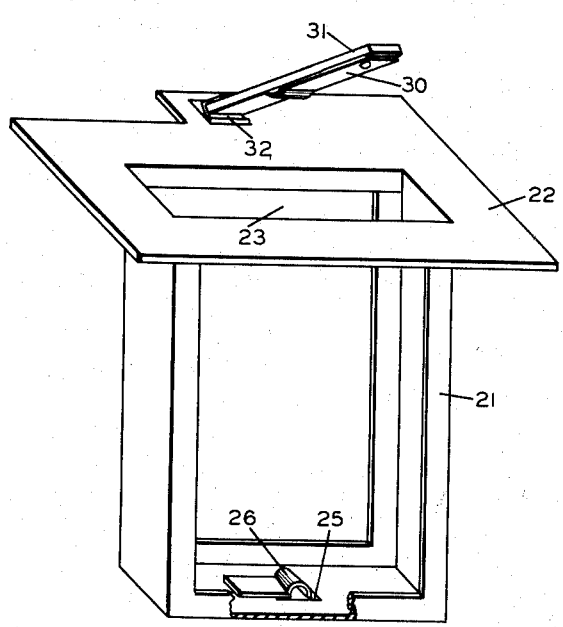
FIG. 9
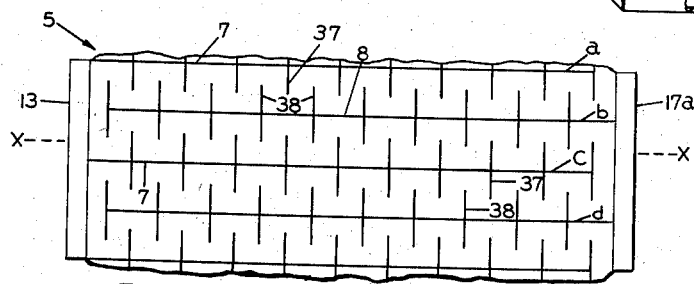
FIG. 10
FIG. 11
FIG. 12
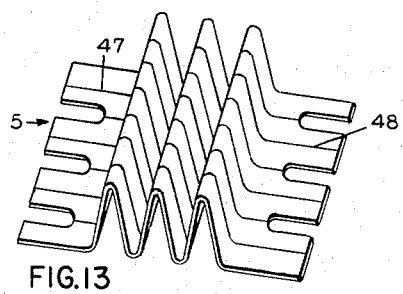
FIG. 13
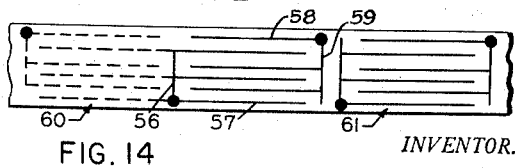
FIG. 14
INVENTOR.
RICHARD D. RIVERS
BY
Arthur H. Robert
ATTORNEY United States Patent Office 2,868,319
Patented Jan. 13, 1959

2,868,319

ELECTROSTATIC AIR FILTER CELL WITH CONDUCTIVELY STRIPED FILTER WEB

Richard D. Rivers, Louisville, Ky., assignor to American Air Filter Company, Inc., Louisville, Ky., a corporation of Delaware Application December 19, 1955, Serial No. 553,858

13 Claims. (Cl. 183—7)

The present invention relates to electrostatic air filters of the type employing an electrostatically charged web of porous air permeable dielectric material disposed across the path of an air stream for removing dust particles therefrom.

In filter cells, of the type disclosed in the True U. S. Patent No. 2,729,302, granted Jan. 3, 1956, a corrugated dielectric web is mounted in a cardboard frame and its transversely extending crests are coated with a conductive material such as aluminum paint to form conductive stripes of one electrical polarity along one face of the cell and of opposite electrical polarity along the opposite face of the cell. In use, the cell is positioned within a housing across an air flow path extending therethrough and its opposite faces are engaged by oppositely disposed housing electrodes. When these electrodes are electrically energized, the conductive stripes will be correspondingly energized so that an electrostatic charge will be built up on and distributed over the corrugated web.

In such a structure, the depth of the corrugations determines the spacing between adjacent conductive stripes of opposite polarity and thus spacing, in turn, determines the effective voltage required to charge the web; hence, a different charging voltage is required for each different model of filter cell involving a change in the depth of the corrugations. Furthermore, this structure is relatively bulky and expensive, since it requires the provision of housing space large enough to accommodate not only the filter cell but also the relatively large electrodes which extend over the opposite faces of the cell.

An important object of the present invention is to provide an electrostatic filter cell, composed of an air pervious dielectric web and a perimetric frame, "which" may be readily inserted into and removed from its operative position within a housing and operatively connected to and disconnected from power upon such movement without requiring any contact to be made or broken between either face of the web itself and the electrodes carried by the housing, "which" eliminates the use of large electrodes over the inlet and outlet faces of the filter cell "and which," together with the housing electrodes, does not require the provision of substantial occupancy space over and above that occupied by the filter cell itself.

Other important objects of the present invention are: to provide, for an electrostatic filter cell, a dielectric web having a novel arrangement of conductive stripes which simplifies the structure and reduces its bulk and cost; to provide a dielectric web having a novel arrangement of conductive stripes which facilitates the electrical connection of such stripes to the power supply; and to provide a versatile dielectric web which may be corrugated to any of a series of predetermined depths without requiring any change in the charging voltage.

In accordance with my invention, the web is provided with a condenser-like series of spaced conductive stripes of opposite electrical sign and these are electrically connected within the cell itself either to electrical terminals on the perimetric frame or to electrical terminal-receiving areas thereon. This simplifies the structure of the cell, eliminates the use of large housing electrodes designed for extensive engagement with each face of the filter cell, and eliminates the necessity of providing a large occupancy space for the housing electrodes since it enables the electrical contact between the filter cell and the housing electrodes to be reduced to two relatively small, indeed extremely small, areas.

In further accordance with my invention, the condenser stripes of opposite sign are spaced the minimum distance, which corresponds to a predetermined or standard charging voltage, while the depth of corrugations of minimum size is made to equal the product of this minimum spacing multiplied by a whole number and of each larger size by the product of the same minimum spacing multiplied by a correspondingly larger whole number. In other words, with one-half inch spacing between condenser stripes of opposite polarity, which corresponds to a charging voltage of 3 kv., the web may be folded either at ½" intervals or at 1" intervals or at 1½" intervals, etc., while for corrugations of 1" or greater, that portion of the web which extends between adjacent fold lines, is subdivided by additional condenser-like stripes into ½" spaces bordered on two opposite sides by stripes of opposite electrical sign. Consequently, only one charging voltage is required for filter cells of this character; hence the necessity of changing the charging voltage to correspond with the change in the depth of the corrugations, is eliminated.

The invention is illustrated in the accompanying drawings wherein:

Figure 8 is a diagrammatic view of a portion of an air conditioner which incorporates the filter cell of Figures 1–3;

Figure 9 is a perspective view of the cell receiving, air conditioner frame shown in Figure 8;

Figure 10 is an enlarged fragmentary section of a filter web which has been creased to facilitate folding; and Figures 11, 12, 13 and 14 illustrate a series of dielectric webs and spaced conductive stripes arranged to form different condenser-like patterns.

Figure 1:
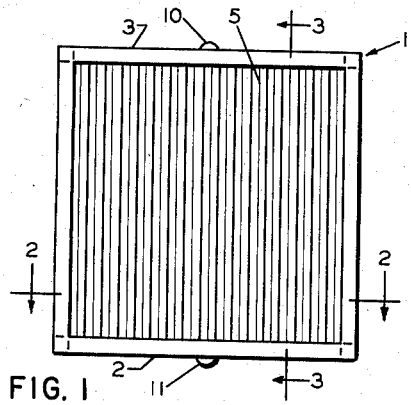
Figure 1 is a face or elevational view of a corrugated filter cell constructed in accordance with the present invention, this cell containing a corrugated web.
Figure 2:
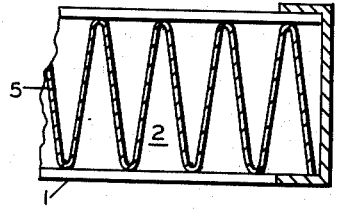
Figure 2 is a section taken through Figure 1, along line II—II which extends at right angles to the corrugations.
Figure 3:
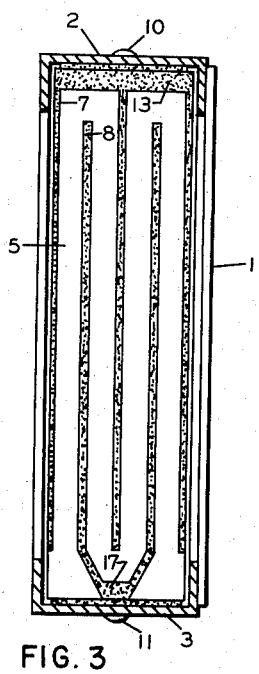
Figure 3 is a section taken through Figure 1, along line III—III, which extends at right angles to line II—II.

In the foregoing drawings, Figures 1–8 all relate to the filter cell shown in Figures 1–3, which comprises: a frame; a dielectric web; and electrostatic charge distributing means.

FRAME

The frame 1 is conventionally constructed to form an open faced, perimetric frame 1 having four perimetric walls, including end walls 2 and 3, and suitable marginal flanges framing each open face. This frame is conventionally composed of cardboard or any other suitable material which preferably is nonconductive electrically.

DIELECTRIC WEB

The web 5 is composed of air pervious dielectric air filter material disposed within, and mounted on the interior of, said frame 1 to extend across the interior thereof. Preferably, it extends in corrugated fashion from one side perimetric wall to the other with its opposite corrugated edges respectively abutting opposed end walls 2 and 3. The web 5 may be composed of any suitable air permeable dielectric sheet material such as paper, cloth or glass in felted or woven form. Preferably, it is composed of glass fibers which are felted, woven or otherwise bonded together.

DISTRIBUTING MEANS

The distributing means comprises: condenser-like stripes on the web; electric terminals or terminal receiving areas on the frame; and internal means connecting the stripes to the terminals.

Condenser-like stripes

The web 5 contains a condenser-like series of spaced conductive stripes comprising: alternate stripes 7 of one electrical sign; and intermediate stripes 8 of opposite electrical sign. These lines may be sprayed, silk-screened or printed on the web, the printing being preferred because of the simplicity of this operation and the rapidity with which it may be performed. The conductive coating may be of any suitable material having an aluminum, silver or graphite base. The conductive graphitic paints and inks are preferred because they are readily available and easy to apply. Colloidal graphite suspended in water or in an organic solvent, has very good conductivity and good adhesion.

Figure 4:
Figure 4 is a developed plan view of the dielectric web used in the cell of Figures 1–3.
Figure 6:
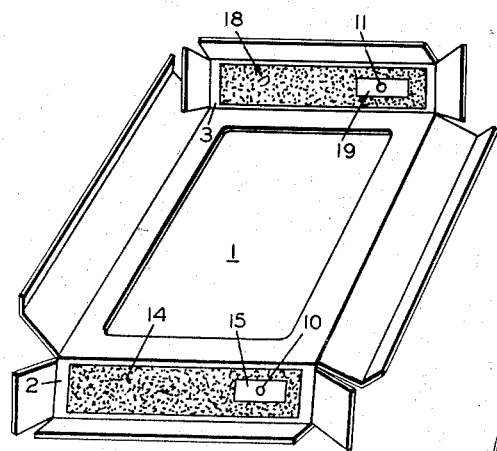
Figure 6 is a perspective view of the frame of the Figures 1–3 filter cell, this frame being unfolded for the sake of clarity.

While various patterns of stripes 7 and 8 may be employed, the pattern shown particularly in Fig. 4 comprises straight parallel conductive cross stripes extending, as straight lines, transversely across the web from the vicinity of the inner boundary of one marginal area of the web to the vicinity of the inner boundary of the other marginal area thereof.

Electric terminals

While any form of electric terminals may be used and mounted in any suitable way on the frame, in the cell illustrated, the terminals are in the form of metal rivets 10 and 11 which are riveted to opposed end walls 2 and 3 respectively. The preferred location of the cell terminals or cell terminal areas will, of course, depend on factors such as the design of the stripe pattern and of the housing.

Before passing on, it may be noted that, instead of having outwardly projecting terminals 10 and 11, my invention contemplates the use of an opening in the frame at either or both terminal areas to receive a removable inwardly projecting housing connector or terminal.

Internal connecting means

The internal connecting means includes means within the frame electrically connecting one end of the stripes of one electrical sign to one terminal and the opposite end of the stripes of opposite electrical sign to the other terminal.

Accordingly, one longitudinal margin of the web is provided with a longitudinal stripe 13 which connects with the adjacent end of each alternate cross stripe 7 while the adjacent end wall 2 is provided with a conductive surface coating 14 electrically connecting the marginal strips 13 to the terminal 10 when the filter cell is assembled. To insure a good electrical connection between the conductive coating 14 on end wall 2 and the electrical terminal 10 on that wall, this terminal is provided, at its inner end, with a metal plate 15 which is pressed firmly against the conductive coating by the terminal 10 when the latter is riveted to end wall 2. Preferably, the corrugated end of the web, which bears marginal stripe 13, is bonded to end wall 2 either by a conductive glue or one having little or no dielectric strength or insulating property.

The opposite longitudinal margin may be provided with a continuous stripe of conductive material corresponding to stripe 13 but it is shown as being provided with a succession of conductive spots or patches 17, one for the adjacent ends of each pair of intermediate conductive cross stripes 8 while the adjacent end wall 3 is similarly provided with a conductive surface coating 18 electrically connecting the patches 17 to the adjacent terminal 11. A metal plate 19 is held by rivet terminal 11 against surface coating 18 to promote a good electrical connection at this point. Also the corrugated margin of the web, which contains the conductive spots or patches 17, may be and preferably is glued or otherwise bonded to the inner surface of end wall 3, in the same manner as the opposite margin is bonded to end wall 2.

AIR CONDITIONER

The room cooler or air conditioner, illustrated in Figs. 8 and 9, is adapted to receive an electrostatic filter cell, which is also designated 1. The housing of this conditioner unit comprises a perimetric U-shaped channel frame 21 disposed across the path of air flow and suitably attached, at its upper ends, to a plate 22 having an access opening 23 through which a filter cell 1 may be inserted and removed. A motor operated blower 24 is provided for moving air through the filter cell. The lower or bight portion of channel frame 21, which has an opening 25, carries a resilient housing terminal 26, which extends over opening 25.

The plate 22 of the air conditioner housing carries an insulator 28 containing the housing terminal 29 for the high side of the electrical power suply. In order to connect the "hot" housing terminal 29 to the top cell terminal 10, in a safe manner, means is provided for making and breaking that connection while simultaneously blocking and unblocking the access opening 23.

To this end, a bridge conductor 30 is mounted on the under side of a hinged blocking arm 31 for movement, about the hinge 32 of the arm, from an operative blocking position to an unblocking or maintenance position. In the blocking position, which is shown in Fig. 8, the bridge connector 30 engages both housing terminal 29 and cell terminal 10 and thus electrically connects them together while the arm 31 extends over the access opening 23 to block the insertion into or removal from the frame 21, of a filter cell 1. In the maintenance position, the bridge conductor 30 and the arm 31 are removed to one side of the access opening 23, thus breaking the electrical connection between housing terminal 29 and cell terminal 10 while rendering the cell space within frame 21 accessible through access opening 23.

Accordingly, when a filter cell 1 is inserted endwise into frame 21, with cell terminal 11 foremost or lowermost, this cell terminal 11 will engage the bottom housing terminal 26 to provide a ground connection for the intermediate stripes 8 extending from the stripes 8 successively through patches 17, end wall coating 18, metal plate 19, cell terminal 11 and housing terminal 26 to the ground side of a power supply. Likewise, when the arm 31 is swung into the operative blocking position, the bridge conductor 30 will engage the upper terminals 10 and 29 of both cell and housing to establish a power connection for the alternate stripes 7 extending from the stripes 7 successively through marginal stripe 13, end wall coating 14, metal plate 15, cell terminal 10, bridge conductor 30 and housing terminal 29 to the "hot" or power side of the power supply.

CONDENSER STRIPE SPACING

Heretofore a condenser-like series of cross stripes was employed in which adjacent stripes of opposite electrical sign were spaced from each other a distance equal to the depth of the corrugations. This necessitated the use of a different charging voltage for each different corrugation depth employed.

In accordance with the present invention, the condenser stripes of opposite sign are spaced a distance corresponding to a predetermined or standard charging voltage while the depth of corrugations of different sizes is made to equal the product of this spacing times a whole number corresponding to the corrugation size. For example, a charging voltage of 3,000 D. C. may be employed with ½″ spacing between condenser stripes of opposite polarity. This same charging voltage can, therefore, be used in filter cells having corrugations of ½″ depth, which is the product of ½″ times the whole number 1, or of 1″ depth, which is the product of ½″ times the whole number 2 or of any depth which is the product of ½″ times any other whole number such as 3, 4, etc. Before passing, it may be noted that folding of the web into corrugations will be facilitated by creasing the potential fold lines as indicated at 34 in Fig. 10.

Where the cross stripes 7 and 8 are spaced from each other the minimum distance, no other pattern of condenser-like cross stripes need be employed. However, other patterns involving the use of other lines may be desirable and to illustrate suitable patterns utilizing cross stripes in combination with other lines, reference will now be made to the "comb" and "maze" patterns as shown in Figs. 11 and 12.

COMB PATTERN

In the comb pattern of Figure 11 we assume that a ½″ spacing of condenser-like stripes of opposite sign is desirable and that the cross stripes 7 and 8 are spaced from each other a distance of one inch. With these assumptions a ½″ spacing of condenser-like stripes may be accomplished as follows: first, by having the intermediate stripes 8 terminate ½″ from the marginal stripes 13 and the alternate stripes 7 terminate ½″ from the marginal conductor of opposite electrical sign which, in this case, is illustrated in the form of marginal stripe 17a instead of patches 17; and second, by providing each alternate stripe 7 with one series of fret stripes 37, which are transversely spaced along stripe 7 at 1″ intervals and which extend from stripe 7 toward but terminate ½″ short of each of the adjacent intermediate cross stripes 8, and providing each intermediate stripe 8 with a corresponding series of fret stripes 38 spaced at 1″ intervals in position to alternate with the fret stripes 37 so as to provide frets of opposite sign at ½″ intervals.

In a pattern of this character, the cross stripes 7 and 8 may be spaced from each other distances greater than 1″ in which event the fret stripes are correspondingly lengthened. Also, with this pattern, the corrugated web may be folded at 1″ intervals along alternate and intermediate stripes designated "a" and "b" respectively for corrugations 1″ deep, or at 2″ intervals along stripes designated "a" and "c" for corrugations 2″ deep, or at 3″ intervals along stripes designated "a" and "d" for 3″ corrugations, etc.

Normally, this pattern should not be folded along any line between adjacent alternate and intermediate stripes 7 and 8 such, for example, as the line X—X shown midway between intermediate stripe "b" and alternate stripe "c." The reason for this is that such folding tends to bring the intermediate stripe "b" and the alternate stripe "c" into a spaced relationship of less than the assumed minimum of ½″ for a 3 kv. operation.

MAZE PATTERN

Figure 12 illustrates a maze pattern having successive fold lines on alternate stripes 7 which are spaced from each other a distance of 2″. For a 3 kv. operation, the space between these alternate stripes 7 must be subdivided into 2″ spaces each having conductive lines of opposite polarity along opposite sides. Accordingly, the intermediate stripe 8, which lies between these alternate stripes, is provided with three sections as follows, namely: an end section "K" which proceeds from marginal stripe 17a as a straight line spaced ½″ from one of the alternate electrodes 7; a center section "M" which proceeds as a straight line spaced ½″ from the other alternate stripe 7; and a free end section "P" which proceeds as a straight line spaced ½″ from the first mentioned alternate stripe 7, these sections being connected in series. The maze, which is partly formed by the tortuous intermediate stripe 8 and both of the straight alternate cross stripes 7, is completed by adding branch lines to each of the alternate and intermediate stripes. The maze thus formed subdivides the space between successive alternate stripes 7 in such a way that each section of the intervening space has two of its opposite sides bounded by conductive lines of opposite electrical sign which are spaced ½″ apart.

The maze pattern of Fig. 12 must be folded along alternate lines 7 so that, with ½″ spacing between stripes of opposite electrical sign, the minimum corrugation depth is 2″. Naturally, with ½″ spacing between stripes of opposite polarity and with alternate lines spaced 2″ apart, this particular maze pattern permits the use of larger corrugation depths such as 4″, 6″, etc.

LONGITUDINAL PATTERNS

Figure 5:
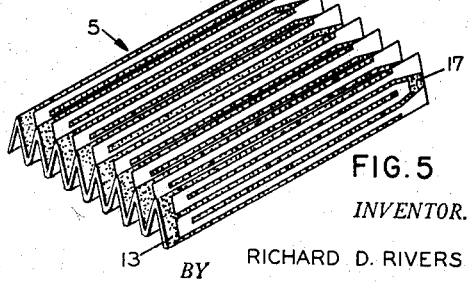
Figure 5 is a perspective view of the corrugated web.
Figure 7:
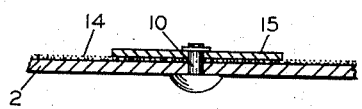
Figure 7 is an enlarged fragmentary, sectional view taken through an end wall terminal of the frame.

Figures 4 and 5 illustrate a "transverse" pattern composed only of straight parallel cross stripes 7 and 8 of minimum spacing. Figure 13 illustrates one "longitudinal" pattern composed only of straight parallel longitudinal stripes comprising alternate stripes 47 and intermediate stripes 48. In this longitudinal pattern, the stripes are connected at opposite transverse ends of the web through suitable conductive coatings on the frame to appropriate terminals or terminal-receiving areas. This arrangement has the advantage of permitting the use of any range of corrugation depths since the corrugation depth does not have to be related in any way to the minimum spacing of condenser stripes of opposite polarity. The chief disadvantage of this design is that, since each stripe runs substantially the entire length of the web and is connected only at one end, there is a possibility that, due to a break in one or more stripes or to a high electrical resistance at one point or another in one or more of them, some portions of the web may be ineffectively charged. Also, a filter medium containing the pattern of Figure 13 cannot be taken from a roll and cut to different lengths unless the end edges are scalloped or serrated as indicated wherein the alternate stripes are cut away at one end and the intermediate stripes at the other. In other words, this medium is best suited for use in a custom built structure where the web is of a predetermined length and the pattern is designed for that length.

Figure 14 illustrates another "longitudinal" pattern wherein a cross stripe 56 electrically connects one section of longitudinal stripes 57 while the cooperating section of intermediate stripes 58 are connected electrically together by a cross stripe 59. As indicated in Figure 14, this pattern may be duplicated: on the opposite side of cross stripe 56, as indicated by the dotted line pattern 60, which is connected to the cross stripe 56; and at spaced intervals as indicated by the full line pattern 61.

MISCELLANEOUS

A strip of metal foil may, of course, be used in place of either (or both) the coating 14 or the metal plate 15 on the frame 1. The marginal line 13, which is shown in Figure 4 as a continuous line of conductive material, may, of course, be a broken line similar to the broken line formed by the patches 17 on the other margin of the Figure 4 web. Naturally broken marginal lines may be used in the patterns of Figures 11 and 12 in place of the continuous marginal lines 13 and 17a. Of course, the remarks made concerning the end margins and the side margins of "transverse patterns" apply to the "longitudinal patterns" of Figures 13 and 14.

Having described my invention, I claim:

1. An electrostatic air filter cell comprising an open-faced perimetric frame, a web of air pervious di-electric air filter material mounted within said frame and having its edge portions disposed in abutting relation therewith, and means for distributing an electrostatic charge over said web including, a first series of electrically conductive stripes on said web terminating adjacent one edge thereof, a second series of electrically conductive stripes on said web disposed in predetermined spaced relation with said first series of stripes and terminating adjacent another edge of said web, terminal means mounted on said frame for selective connection thereto of a source of electrical power of a predetermined polarity and conductive means disposed intermediate said frame and said first mentioned abutting edge portion of said web for providing a selective electrical connection intermediate said terminal means and said first series of conductive stripes.

2. The filter cell as set forth in claim 1 including second terminal means mounted on said frame and second conductive means disposed intermediate said frame and said second mentioned edge portion of said web for providing a selective electrical connection intermediate said second terminal means and said second series of conductive stripes.

3. The cell of claim 1 including an electrically conductive stripe disposed along said first mentioned marginal edge of said web connecting the ends of at least a plurality of the stripes included in said first series thereof.

4. The cell of claim 1 wherein said connecting means includes an electrically conductive coating on the inner face of said frame positioned to engage said first mentioned edge portion of said web in the assembled unit.

5. An electrostatic air filter cell comprising an open-faced perimetric frame, a web of air pervious di-electric air filter material mounted within said frame and having its edge portions disposed in abutting relation therewith, a first series of uniformly spaced electrically conductive stripes on said web terminating adjacent one edge thereof, a conductive stripe along said edge portion commonly connecting the adjacent ends of at least a plurality of the stripes included in said first series thereof, a second series of electrically conductive stripes on said web disposed in predetermined uniform spaced interleaved relation with said first series of stripes and terminating adjacent another edge of said web remote from said first mentioned edge thereof, a second conductive stripe along said second mentioned edge portion commonly connecting the adjacent ends of at least a plurality of the stripes included in said second series thereof, first externally accessible electrical terminal means mounted on said frame, first conductive means mounted intermediate the inner face of said frame and said first mentioned abutting edge portion of said web for providing a selective electrical connection intermediate said externally accessible first terminal means and said first series of conductive stripes, second externally accessible terminal means mounted on said frame and second conductive means mounted intermediate the inner face of said frame and said second mentioned abutting edge portion of said web for providing a selective electrical connection intermediate said externally accessible second terminal means and said second series of conductive stripes.

6. An electrostatic air filter cell comprising an open-ended perimetric frame, a web of air pervious dielectric air filter material extending across the interior of said frame to clean air electrically when electrostatically charged and mechanically whether charged or uncharged and means for distributing an electrostatic charge over the web, said distributing means including a first series of uniformly spaced electrically-conductive cross stripes of one electrical sign symmetrically distributed on the web, a second series of uniformly spaced electrically conductive cross stripes of opposite electrical sign symmetrically distributed on the web with each of said stripes being disposed intermediate a pair of cross stripes included in said first series of stripes, a first electrical terminal area on said frame, a first electrically conductive material on an inner face of said frame electrically connecting said first terminal area with the adjacent ends of the cross stripes in said first series of stripes, a second electrical terminal area on said frame and a second electrically conductive material on an inner face of said frame electrically connecting said second terminal area with the adjacent ends of the cross stripes in said second series of stripes.

7. An electrostatic air filter cell comprising an open-faced perimetric frame, a web of air pervious dielectric air filter material extending across the interior of said frame to clean air electrically when electrostatically charged and mechanically when charged and uncharged and means for distributing an electrostatic charge over the web, said distributing means including a pair of transversely spaced lines of conductive material extending on and longitudinally along opposite margins of said web, a first series of uniformly spaced symmetrically distributed electrically conductive alternate cross stripes of one electrical sign extending on and transversely across the web from contact with one line toward but terminating short of the other line, a second series of uniformly spaced symmetrically distributed electrically conductive intermediate cross stripes of opposite electrical sign extending on and transversely across the web from contact with the other line toward but terminating short of said one line, the alternate cross stripes alternating with the intermediate cross stripes, an electrical terminal area on said frame and an electrical connection extending within said frame from stripes of one electrical sign on the web to said area on the frame.

8. The cell of claim 7 wherein said web is corrugated with successive crest fold lines coinciding with certain cross stripes.

9. The cell of claim 7 including: transversely-spaced alternate fret stripes extending on and longitudinally along said web from each of said alternate cross stripes toward but terminating short of the adjacent intermediate cross stripes; and transversely-spaced intermediate fret stripes extending on and longitudinally along the web from each of said intermediate cross stripes toward but terminating short of the adjacent alternate stripes; the alternate fret stripes alternating with the adjacent intermediate fret stripes.

10. An electrostatic filter element of the type coated with material forming electrically conductive stripes, comprising: a web of air pervious dielectric air filter material; a pair of transversely-spaced lines of conductive material extending on and longitudinally along said web; longitudinally-spaced alternate cross stripes of one electrical sign extending on and transversely across the web from its contact with one line toward but terminating short of said other line; and longitudinally-spaced intermediate cross stripes of the other electrical sign extending on and transversely across the web from its contact with the other line toward but terminating short of said one line; the alternate cross stripes alternating with and being uniformly spaced from said intermediate cross stripes.

11. The filter element of claim 10 wherein: at least one of said lines extends continuously on and longitudinally along one marginal edge of said web.

12. The filter element of claim 10 wherein: said web is corrugated with successive crest fold lines coinciding with certain cross stripes.

13. The filter element of claim 10 including: transversely-spaced alternate fret stripes extending on and longitudinally along said web from each of said alternate cross stripes toward but terminating short of the adjacent intermediate cross stripes; and transversely-spaced intermediate fret stripes extending on and longitudinally along the web from each of said intermediate cross stripes toward but terminating short adjacent of said alternate cross stripes; the alternate fret stripes alternating with the adjacent intermediate fret stripes.

References Cited in the file of this patent

UNITED STATES PATENTS

| | | |
|---|---|---|
| 1,059,253 | Wimbish | Apr. 15, 1913 |
| 2,729,302 | True | Jan. 3, 1956 |

FOREIGN PATENTS

| | | |
|---|---|---|
| 1,069,703 | France | Feb. 17, 1954 |
| 1,109,084 | France | Sept. 21, 1955 |